Dec. 5, 1939.   A. J. PHELAN ET AL   2,182,407
MOTOR VEHICLE POWER TRANSMISSION
Filed May 17, 1939
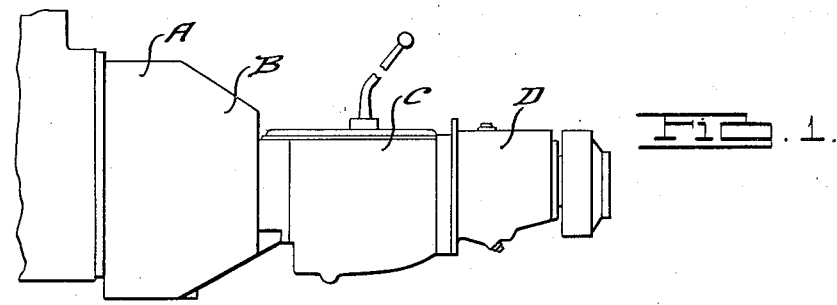
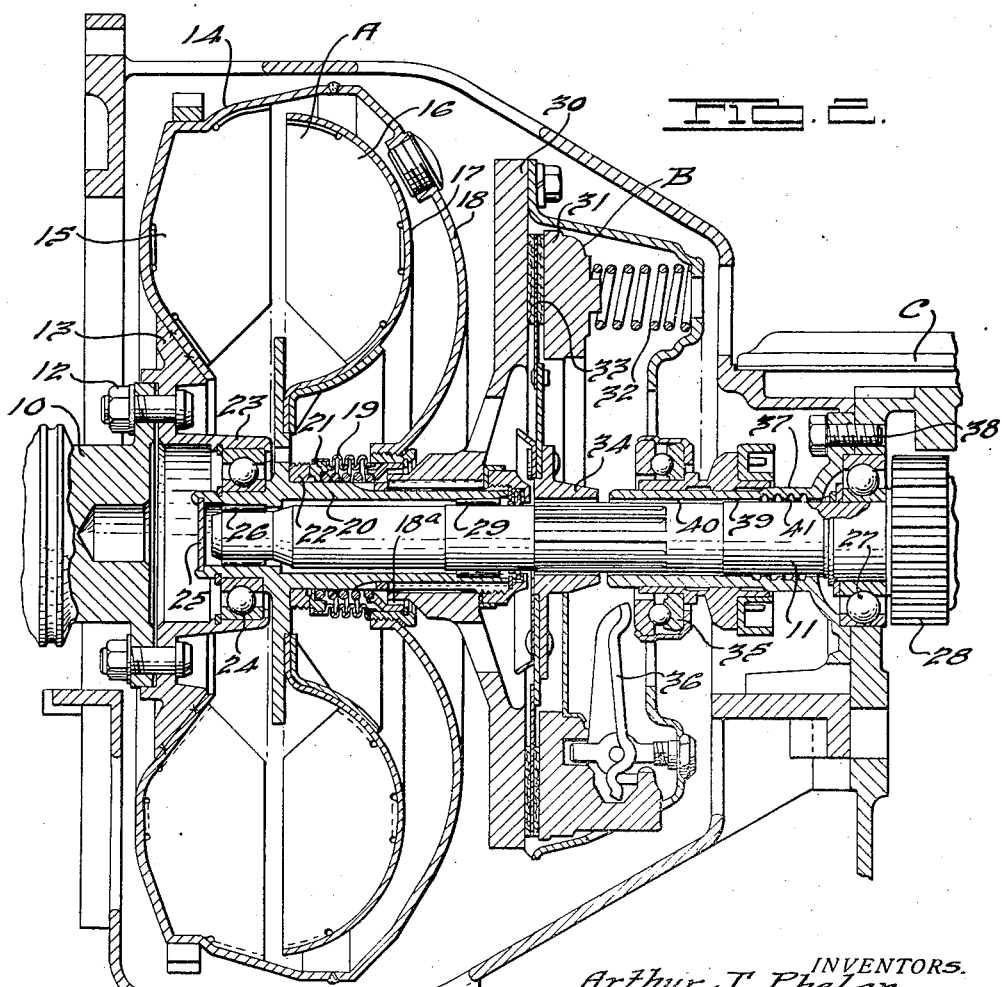
INVENTORS.
Arthur J. Phelan,
BY Hubert S. Phelan.
ATTORNEYS.

Patented Dec. 5, 1939

2,182,407

UNITED STATES PATENT OFFICE

2,182,407

MOTOR VEHICLE POWER TRANSMISSION

Arthur J. Phelan, Detroit, and Hubert S. Phelan, Berkley, Mich., assignors to Chrysler Corporation, Highland Park, Mich., a corporation of Delaware Application May 17, 1939, Serial No. 274,240

4 Claims. (Cl. 192—57)

This invention relates to motor vehicles and refers more particularly to improvements in the power transmission for driving motor vehicles.

This application is a continuation in part of our application Serial No. 228,296, filed September 3, 1938.

One object of our invention is to provide an improved system of power transmission of the type embodying a fluid couping of the kinetic type which transmits the drive from the engine to the vehicle under control of a clutch operable to release or establish the drive from the fluid coupling. In practice the clutch is preferably located in the drive between the fluid coupling and a speed ratio changing transmission of any suitable type.

Power transmission systems of the aforesaid type have been proposed but difficulty has been experienced in providing desired relationship of the parts from standpoints of adequate bearing supports, freedom from binding of the various parts, and arranging the parts so that they do not require more room than is conveniently available for the assembly as a whole. We have provided a power transmission system which, among other things, overcomes the aforesaid difficulties and is especially adapted for commercial manufacture and use in motor vehicle drives.

A further object of our invention is to provide an improved arrangement of fluid coupling and clutch so related to the engine driving shaft and the transmission that the coupling and clutch will not bind at the various supporting bearings and will not result in an out of balance condition even where minor misalignment of the crankshaft and transmission bearings occurs. It is highly important to provide and preserve a very accurate running balance for the fluid coupling runner, which presents a large mass when considered with the working fluid carried thereby, and great difficulty has been experienced in commercial uses of fluid couplings and clutches to provide and maintain a running balance of these parts within the ordinary tolerances required for alignment of the support bearings. The problem is aggravated by the use of a clutch behind the fluid coupling as this clutch, preferably of the usual dry-plate commercial type, is quite massive and introduces further problems of deflections in the supporting means, out of balance tendencies, and other difficulties.

We have provided an arrangement which overcomes the aforesaid difficulties and makes possible the use commercially of fluid coupling and clutch installations in motor vehicles.

In carrying out our invention we mount the coupling runner and the relatively massive driving parts of the clutch on the transmission input shaft which is supported at its front end on the crankshaft by a ball bearing and at its rear end on the transmission by a ball bearing. These ball bearings act as universal joints to accommodate misalignment of the crankshaft and transmission within the limits customarily experienced in ordinary commercial practice in assembling automobiles. The transmission input shaft is free to tilt slightly without binding at any point and as the coupling runner and clutch, including the driven clutch disk, are all mounted and centered on the input shaft their desired balanced relationship is preserved even for the slight misalignment and tilting referred to above.

In order to even further obtain and preserve great accuracy in the balance of the coupling runner, the latter is preferably formed with a relatively long hub whose front end is directly supported by the crankshaft ball bearing and whose rear end carries the driving parts of the clutch. Thus, the transmission input shaft is relieved of a large amount of the coupling runner load thereby avoiding objectionable shaft deflections and "whip" and the runner balance is facilitated by being centered directly at the front ball bearing which also acts as a thrust bearing for the runner in opposite axial directions.

Further objects and advantages of our invention will be more apparent as this specification progresses with reference to one illustrative embodiment of our invention. In the accompanying drawing:

Fig. 1 is a side elevational view of the power transmitting assembly.

Fig. 2 is a longitudinal sectional elevational view of the fluid coupling and clutch of the Fig. 1 assembly.

Referring to the drawing, reference numeral 10 represents the forward end of the engine crankshaft which is the driving shaft for the power transmission system, the crankshaft being adapted to transmit the drive through a fluid coupling A of the kinetic type. The fluid coupling is arranged to transmit the drive through a clutch B which, for the most part, may be of any suitable well known type for transmitting the drive to the transmission input shaft 11 which preferably leads to any suitable type of speed ratio changing mechanism or, if preferred, the input shaft 11 may be arranged to drive the usual ground wheels (not shown) of the vehicle without passing through any selectively operable speed ratio changing mechanism.

In the illustration the input shaft 11 is adapted to drive the speed ratio changing mechanism C of any suitable type and the drive from transmission C may pass through an auxiliary transmission D which, when employed, is preferably in the form of an overdrive mechanism of the usual well known type. The drive from the mechanism D passes in the usual manner to the driving ground wheels of the vehicle.

Secured to the rear end of crankshaft 10 by the fasteners 12, we have provided a supporting journalling member 13 on which is drivingly mounted the impeller structure 14 of fluid coupling A, this impeller having the usual radially extending vanes 15 for directing the fluid medium by the action of centrifugal force toward corresponding vanes 16 of the runner structure 17 whereby to transmit the drive from the impeller to the runner in the well known manner. The impeller 14 extends rearwardly and inwardly through the shrouding or cover portion 18 thereby enclosing the runner 17 and in order to seal the fluid coupling against escape of the fluid we have provided the sealing structure 19 between the shrouding 18 and the hollow hub 20 on which the runner 17 is drivingly mounted, it being understood that the runner is adapted to rotate relative to the impeller and its shrouding 18. The sealing structure 19 rotates with the shrouding 18 and is provided with a sealing ring 21 which rotatably engages a companion sealing member 22 carried by the hollow hub 20 in order to accommodate this relative rotation between the impeller and runner while preventing the escape of fluid from the coupling A. The arrangement is such that hub 20 along with shaft 11 may tilt freely without binding at shrouding 18 by reason of the clearance at 18ᵃ.

The support member 13 has a portion 23 thereof which extends rearwardly within the fluid coupling and carries an anti-friction ball bearing 24 providing a journal support for the forwardly extending end of the hub 20 which extends forwardly within the portion 23 of the supporting member 13. The ball bearing 24 also acts as a thrust bearing preventing axial displacement of hub 20 in either direction and absorbing axial thrusts from the runner 17. The forward end of hub 20 is closed by a plug 25 for preventing escape of the fluid from the coupling at this point. Located preferably concentrically within the bearing 24, we have provided a second bearing 26 preferably of the anti-friction roll type for journalling the forward end of the input shaft 11, the rear end of this shaft being supported by a third bearing 27 of the anti-friction ball type carried by the speed ratio transmission C. The rear end of the input shaft may have the usual input pinion or gear 28 for transmitting the drive to the transmission mechanism C.

The hollow hub 20 extends rearwardly preferably with clearance with respect to the shrouding 18 so that hub 20 may tilt slightly without binding at the shrouding, the rear end of the hollow hub being journalled by a fourth bearing 29 preferably of a type similar to the aforesaid bearing 26. Fixed to the rear end portion of the hollow hub 20 so as to surround the bearing 29 we have provided the flywheel-like driving member 30 of the clutch B which may be of the usual well known friction type carrying the pressure plate 31 loaded by springs 32 for establishing the drive between the relatively massive clutch driving members 30 and 31 and the relatively light weight friction disc 33 which provides the driven member of the clutch B.

The driven disc 33 is carried by a hub 34 drivingly secured to the input shaft 11 adjacent the rear end of the hollow hub 20. Any suitable means may be arranged to disengage the clutch B as for example the throw-out mechanism 35 adapted to operate through the usual levers 36 to move the pressure plate 31 rearwardly against the action of the springs 32. The throw-out mechanism 35 is slidable on a forwardly extending hollow sleeve 37 which is rigidly fixed by fasteners 38 to the casing of transmission C so that the hollow sleeve projects cantilever-like from the transmission casing where it derives its sole support. The input shaft 11 is free to tilt slightly by a universal action at roller bearings 24 and 27 to compensate without binding for any minor misalignment between crankshaft 10 and transmission C. Therefore, in order to realize such free tilting action of the input shaft 11 it is necessary that shaft 11 be free from transversely fixed restraint at any point between bearings 24 and 27. The sleeve 37 is therefore provided with a clearance 39 with shaft 11, this clearance being greater as at 40 adjacent the forward end of the sleeve 37 to insure against binding of the shaft at the regions more remote from the point of universal support at bearing 27. We have found that a clearance tolerance of approximately from .011 to .016 of an inch is adequate for the clearance 39 under average conditions, in order to realize the benefits of our invention. If desired, the clearance 39 may have an oil packing associated therewith but as the sleeve 37 does not journal the shaft 11 it does not require lubrication. If desired the sleeve 37 may have an internal thread 41 of such hand that the rotation of shaft 11 will tend to urge any oil, which may accumulate thereon, back toward bearing 27.

In the operation of the mechanism the crankshaft 10 and the impeller structure 14 rotate in unison causing the fluid in the coupling A to rotate the runner 17 thereby driving the hollow hub 20 and the driving member 30 of clutch B. When this clutch is engaged, as illustrated, the drive passes through the driven disc 33 to the input shaft 11 and thence through the mechanisms C and D to drive the vehicle. The fluid coupling A will ordinarily provide sufficient inherent slip at low speeds so that when the engine is idling the clutch B may be left engaged and the mechanisms C and D in driving condition without any drive passing from the crankshaft 10 to the runner structure 17 and hollow hub 20. However, in order to facilitate manipulation of the mechanism C for changing gears therein, as when the car is being driven, the clutch B is preferably disengaged during the time of speed ratio changes in order to facilitate such changes without tendency to clash the gears. Also at any time when it is desired to interrupt the drive from the crankshaft 10 to the driving wheels of the vehicle the driver may bring this about by disengaging the clutch B by operation of the throw-out mechanism 25.

The fluid coupling A is preferably employed in the system by reason of its slipping characteristics which cushion and dampen the drive through the power transmission system as a whole and also because of the desirable operating characteristics of the fluid coupling which, in general, are well known in affording desirable accelerating characteristics of the motor vehicle as well as providing additional advantages. While the forward end of the hollow hub 20 may, if preferred, be rotatably supported directly by the crankshaft 10, we preferably support this hub by the crankshaft through the medium of the support member 13.

By reason of our novel arrangement of parts including the various bearings, the parts of the power transmission illustrated in Fig. 2 have improved stability without tendency toward objectionable vibration and misalignment of the parts. The input shaft 11, for example, is advantageously arranged in that it extends between the transmission C and crankshaft 10 being journalled at the latter location by the concentrically arranged bearings 26 and 24 through the medium of the forward portion of the hollow hub 20 which, in turn, is given improved stability by reason of the widely spaced bearings 26 and 29 on the input shaft 11.

Furthermore, minor misalignments between the crankshaft 10 and transmission C, such as will ordinarily occur in usual manufacturing practice, are readily compensated for by the universal joint action at bearings 24 and 27 without however causing any binding at these bearings or at any point in the driving parts between the bearings. Also, as the runner 16 and clutch B are centered on shaft 11, tilting of the latter does not throw the parts carried thereby out of balance. In addition, runner 16 is not fully supported by shaft 11 because of the hub 20 being directly journalled at its forward end on the crankshaft at bearing 24, thereby relieving shaft 11 of deflections which might well be objectionable.

We do not limit our invention, in the broader aspects thereof, to any particular combination and arrangement of parts such as shown and described for illustrative purposes since various modifications will be apparent from the teachings of our invention and scope thereof as defined in the appended claims.

We claim:

1. In a motor vehicle power transmission system having a driving shaft and a change speed transmission having an input shaft, a hydraulic coupling of the kinetic type having an impeller structure drivingly connected to the driving shaft and a runner structure, said runner structure having a hollow hub, a bearing of the anti-friction ball type carried by the driving shaft and journalling the forward end of said hub, a second bearing journalling the forward end of the input shaft within the forward end of said hub, a third bearing of the anti-friction ball type carried by said change speed transmission and journalling the rear end of the input shaft, a clutch disposed at the rear of said hydraulic coupling, said clutch comprising a driving clutch member drivingly mounted on the rear end of said hub and a driven clutch member drivingly mounted on the input shaft at a point between said second and third bearings, and a fourth bearing journalling the rear end of said hub on said input shaft, said second and fourth bearings maintaining said runner structure and said driving clutch member centered on said input shaft, said first and third bearings providing the entire support for said input shaft and said hollow hub and being so constructed and arranged as to accommodate universal tilting of said input shaft together with said runner structure and said clutch as a unit to compensate for minor misalignment between the driving shaft and transmission.

2. In a motor vehicle power transmission system having a driving shaft and a change speed transmission having an input shaft, a hydraulic coupling of the kinetic type having an impeller structure, a support member attached to the rear end of the driving shaft for drivingly mounting said impeller, said support member having a hollow journalling portion extending rearwardly of the driving shaft, said hydraulic coupling having a runner structure provided with a hollow hub, a bearing of the anti-friction ball type carried within the hollow journalling portion of said support member and journalling the forward end of said hub, a second bearing journalling the forward end of the input shaft within the forward end of said hub, a third bearing of the anti-friction ball type carried by said change speed transmission and journalling the rear end of the input shaft, a clutch disposed at the rear of said hydraulic coupling, said clutch comprising a driving clutch member drivingly mounted on the rear end of said hub and a driven clutch member drivingly mounted on the input shaft at a point between said second and third bearings, and a fourth bearing journalling the rear end of said hub on said input shaft, said input shaft together with said runner structure and said clutch being free for limited displacement thereof as a unit to compensate for misalignment of the driving shaft and transmission.

3. In a motor vehicle power transmission system having a driving shaft and a change speed transmission having an input shaft, a hydraulic coupling of the kinetic type having an impeller structure drivingly connected to the driving shaft and a runner structure, said runner structure having a hollow hub, a bearing of the anti-friction ball type carried by the driving shaft and journalling the forward end of said hub, a second bearing disposed concentrically within the first said bearing and journalling the forward end of the input shaft within the forward end of said hub, a third bearing of the anti-friction ball type carried by said change speed transmission and journalling the rear end of the input shaft, a friction clutch disposed at the rear of said hydraulic coupling, said clutch comprising a driving flywheel clutch member drivingly mounted on the rear end of said hub and a driven friction plate clutch member drivingly mounted on the input shaft at a point between said second and third bearings, and a fourth bearing disposed forwardly adjacent said driven clutch member and journalling the rear end of said hub on said input shaft, said input shaft together with said runner structure and said clutch being free for limited tilting as a unit accommodated by the first and third said bearings to compensate for misalignment of the driving shaft and transmission.

4. In a motor vehicle power transmission system having a driving crankshaft, a change speed transmission spaced rearwardly from said crankshaft, an input shaft for said change speed transmission, means journalling the rear end of said input shaft on said change speed transmission accommodating limited universal tilting of the driving shaft relative to the transmission, a hydraulic coupling of the kinetic type comprising an impeller connected to the crankshaft and a runner provided with a hollow hub, means journalling the front end of said hub on said crankshaft accommodating limited universal tilting of the hub relative to the crankshaft, means journalling the front end of said input shaft in the front end of said hub, clutch means operably connecting the rear end of said hub with said input shaft at a point intermediate said front end and rear end journalling means for said input shaft, and means journalling the rear end of said hub on said input shaft forwardly adjacent said intermediate point, said input shaft together with said runner and clutch being free to tilt as a unit to compensate for misalignment of the driving shaft and transmission.

ARTHUR J. PHELAN.
HUBERT S. PHELAN.